(12) United States Patent
Freeman et al.

(10) Patent No.: US 10,970,127 B1
(45) Date of Patent: Apr. 6, 2021

(54) SYSTEMS AND METHODS FOR VIRTUAL MACHINE RESOURCE OPTIMIZATION USING MACHINE LEARNING TECHNIQUES

(71) Applicant: Verizon Patent and Licensing Inc., Arlington, VA (US)

(72) Inventors: Eric Freeman, Shrewsbury, MA (US); Hector A. Garcia Crespo, Waltham, MA (US); Matthew Kapala, North Billerica, MA (US); Brent D. Segner, Hilliard, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/788,000

(22) Filed: Feb. 11, 2020

(51) Int. Cl.
*G06F 9/50* (2006.01)
*G06N 20/00* (2019.01)

(52) U.S. Cl.
CPC .......... *G06F 9/5077* (2013.01); *G06N 20/00* (2019.01)

(58) Field of Classification Search
CPC ....................................................... G06F 9/5077
See application file for complete search history.

(56) References Cited

U.S. PATENT DOCUMENTS

| | | | | |
|---|---|---|---|---|
| 2011/0106922 | A1* | 5/2011 | Bouillet | G06F 9/5077 709/221 |
| 2013/0185039 | A1* | 7/2013 | Tesauro | G06F 17/11 703/6 |
| 2015/0347649 | A1* | 12/2015 | Shiraki | G06F 30/20 703/2 |

* cited by examiner

*Primary Examiner* — Sisley N Kim

(57) ABSTRACT

Systems described herein may allow for the intelligent configuration of containers onto virtualized resources. As described, systems described herein may generate configurations based on received parameters for utilization to configure (e.g., install, instantiate, etc.) virtualized resources. Once generated, a configuration may be selected according to determined selection parameters and/or intelligent selection techniques.

20 Claims, 14 Drawing Sheets

401

Containers

| ID | Overall score | Resource 1 | Resource 2 | Resource 3 |
|---|---|---|---|---|
| C1 | 10 | 5 | 5 | 5 |
| C2 | 4 | 6 | 8 | 6 |
| C3 | 6 | 8 | 6 | 8 |
| C4 | 11 | 6 | 5 | 7 |
| C5 | 3 | 10 | 6 | 8 |

Resource 1 score: 22
Resource 2 score: 30
Resource 3 score: 45
Overall score: 38

402

Node 1

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C1 | 5 | 8 | 5 | 8 | 5 | 8 |
| C2 | 6 | 2 | 8 | 0 | 6 | 2 |
|  |  |  |  |  |  |  |
|  |  |  |  |  |  |  |

Node 2

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C3 | 8 | 5 | 6 | 7 | 8 | 5 |
|  |  |  |  |  |  |  |
|  |  |  |  |  |  |  |

Node 3

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C4 | 6 | 7 | 5 | 8 | 7 | 6 |
|  |  |  |  |  |  |  |
|  |  |  |  |  |  |  |

Node 4

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C5 | 10 | 3 | 6 | 7 | 8 | 5 |
|  |  |  |  |  |  |  |
|  |  |  |  |  |  |  |

Containers

| ID | Overall score | Resource 1 | Resource 2 | Resource 3 |
|---|---|---|---|---|
| C4 | 11 | 6 | 5 | 7 |
| C1 | 10 | 5 | 5 | 5 |
| C5 | 3 | 10 | 6 | 8 |
| C2 | 4 | 6 | 8 | 6 |
| C3 | 6 | 8 | 6 | 8 |

Resource 1 score: 70
Resource 2 score: 60
Resource 3 score: 80
Overall score: 70

404

Node 1

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C4 | 6 | 7 | 5 | 8 | 7 | 6 |
| C2 | 6 | 1 | 8 | 0 | 6 | 0 |
|  |  |  |  |  |  |  |
|  |  |  |  |  |  |  |

Node 2

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C1 | 5 | 8 | 5 | 8 | 5 | 8 |
| C3 | 8 | 0 | 6 | 2 | 8 | 0 |
|  |  |  |  |  |  |  |
|  |  |  |  |  |  |  |

Node 3

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
| C5 | 10 | 3 | 6 | 7 | 8 | 5 |
|  |  |  |  |  |  |  |
|  |  |  |  |  |  |  |
|  |  |  |  |  |  |  |

Node 4

| ID | Resource 1 Used | Resource 1 Remainder | Resource 2 Used | Resource 2 Remainder | Resource 3 Used | Resource 3 Remainder |
|---|---|---|---|---|---|---|
|  |  | 13 |  | 13 |  | 13 |
|  |  |  |  |  |  |  |
|  |  |  |  |  |  |  |
|  |  |  |  |  |  |  |
|  |  |  |  |  |  |  |

SYSTEMS AND METHODS FOR VIRTUAL MACHINE RESOURCE OPTIMIZATION USING MACHINE LEARNING TECHNIQUES

BACKGROUND

Containers, which may include operating systems, applications, etc., may be installed on "bare metal" machines and/or virtual machine ("VMs") in a virtual cloud platform for example, which may include discrete sets of hardware resources of one or more hardware machines. A particular set of hardware resources (whether referring to a "bare metal" machine or to a virtual machine) may be referred to as a "node." Nodes in virtualized environments may be provisioned with varying sets of hardware (e.g., varying amounts of processor resources, memory resources, storage resources, etc.). Further, different containers may use, and/or may require, varying amounts of hardware resources.

BRIEF DESCRIPTION OF THE DRAWINGS

FIG. 4A illustrates an example generation, using a "stacking" methodology, of a set of VM configurations, and the generation of multiple configuration scores for each configuration on the basis of different types of resources consumed by the configurations;

FIG. 4B illustrates an example generation, using a "stacking" methodology, of a set of VM configurations, and the generation of multiple configuration scores for each configuration on the basis of different types of resources consumed by the configurations;

DETAILED DESCRIPTION OF THE PREFERRED EMBODIMENTS

Figure 1A:
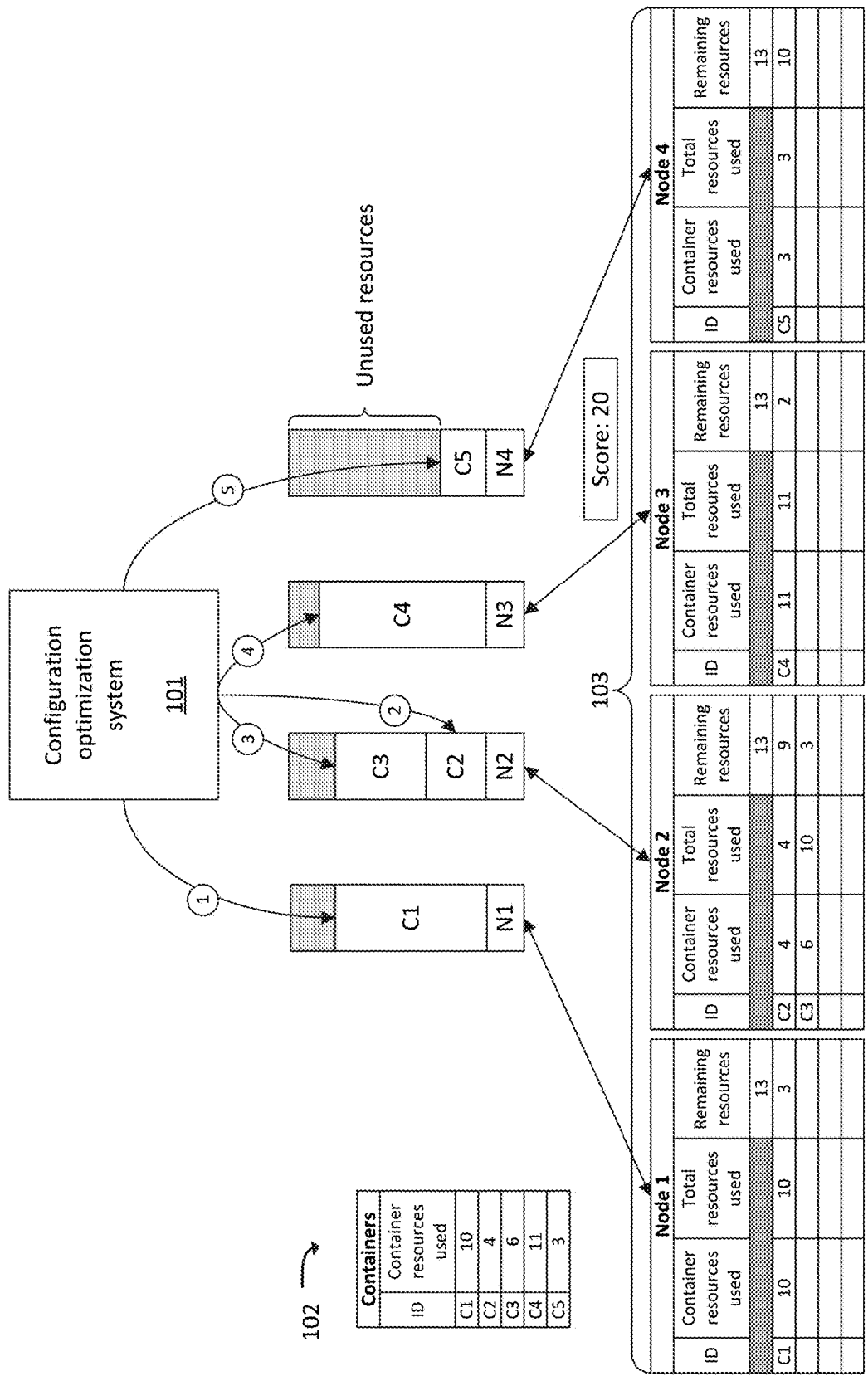
FIGS. 1A and 1B illustrate the example generation, using a "stacking" methodology in accordance with embodiments described herein, of a set of VM configurations.

The following detailed description refers to the accompanying drawings. The same reference numbers in different drawings may identify the same or similar elements.

Embodiments described herein provide for the use of machine learning techniques to determine an optimal configuration of nodes and/or containers installed on the nodes, based on input parameters. The input parameters may specify, for instance, configuration criteria for a desired configuration of a set of containers and/or a set of nodes. For example, the configuration criteria may specify a set of containers to install on a set of nodes, parameters of the containers (e.g., resources consumed or required by the containers, or other parameters), and/or parameters of the nodes on which to install the set of containers (e.g., resources associated with the nodes, such as total or available processor resources, memory resources, storage resources, etc.).

As referred to above, a "node" may be a deployment infrastructure for containers, and may refer to a VM (e.g., a discrete set of resources associated with one or more hardware machines) and/or a "bare metal" machine (e.g., a set of resources associated with one particular hardware machine). A "container" may be a deployment which utilizes the hardware resources of the infrastructure in which it is configured. For example, a container deployed on a node may utilize the resources of the node, including underlying "virtualized" hardware (e.g., hardware provisioned for the node) when applicable.

As described herein, machine learning and/or other suitable techniques may be used to create VM configurations (also referred to herein simply as "configurations"). A configuration may be an arrangement of containers placed in one or more nodes. "Placing" a container may include installing, instantiating, etc. the container on a particular node. Further in accordance with some embodiments, each configuration may receive a configuration score associated with the utilization of one or more resources in that configuration and/or other factors. As discussed herein, a configuration score may indicate, for example, the utilization or non-utilization (e.g., remaining) of one or more resources of one or more nodes, the number of nodes used for a given configuration, and/or other factors. In some embodiments, the generated configuration score may be based on performance metrics associated with the configuration (e.g., processing speed, network throughput and/or latency, etc. of one or more of the nodes and/or containers included in the configurations). The generated configurations may be stored in a repository for future use by a configuration optimization system ("COS"), in accordance with some embodiments.

For instance, as described herein, COS 101 may receive information regarding available nodes, receive configuration criteria specifying one or more containers to deploy and/or parameters associated with nodes on which to deploy the containers, select a particular configuration based on these factors, and deploy the specified containers across a set of nodes in a manner that is based on the selected configuration. The particular configuration may also be selected based on one or more configuration scores associated with the particular configuration. The orchestration system may place the one or more containers (e.g., as specified in the configuration criteria) on a selected set of nodes. As discussed herein, COS 101 may be, or may include, a device or system that is able to provision resources of nodes, and/or is able to install, configure, instantiate, etc. containers onto nodes. In order to perform these functions, the orchestration system may use an application programming interface ("API"), such as the Kubernetes API.

As further described herein, COS 101, may generate, and/or may simulate the generation of, multiple sets of configurations using multiple different methodologies. Utilizing different methodologies may allow for the generation of a diverse set of configurations, which may ultimately reveal more optimal configurations than systems or techniques that do not utilize different methodologies. COS 101 may score different configurations according to varying criteria. Generally speaking, these configuration scores may reflect a measure of efficiency, performance, or other suitable metric associated with each configuration. As described further below, a particular configuration may be identified (e.g., based on an associated configuration score) as an optimal configuration for a given set of configuration criteria, and the optimal configuration may be provided (e.g., installed, instantiated, etc.) once selected. As described herein, COS 101 may be, or may include, a device or system that is able to simulate resources utilized by containers and nodes. COS 101 may include, for example, cloud-based computation devices.

Figure 1B:
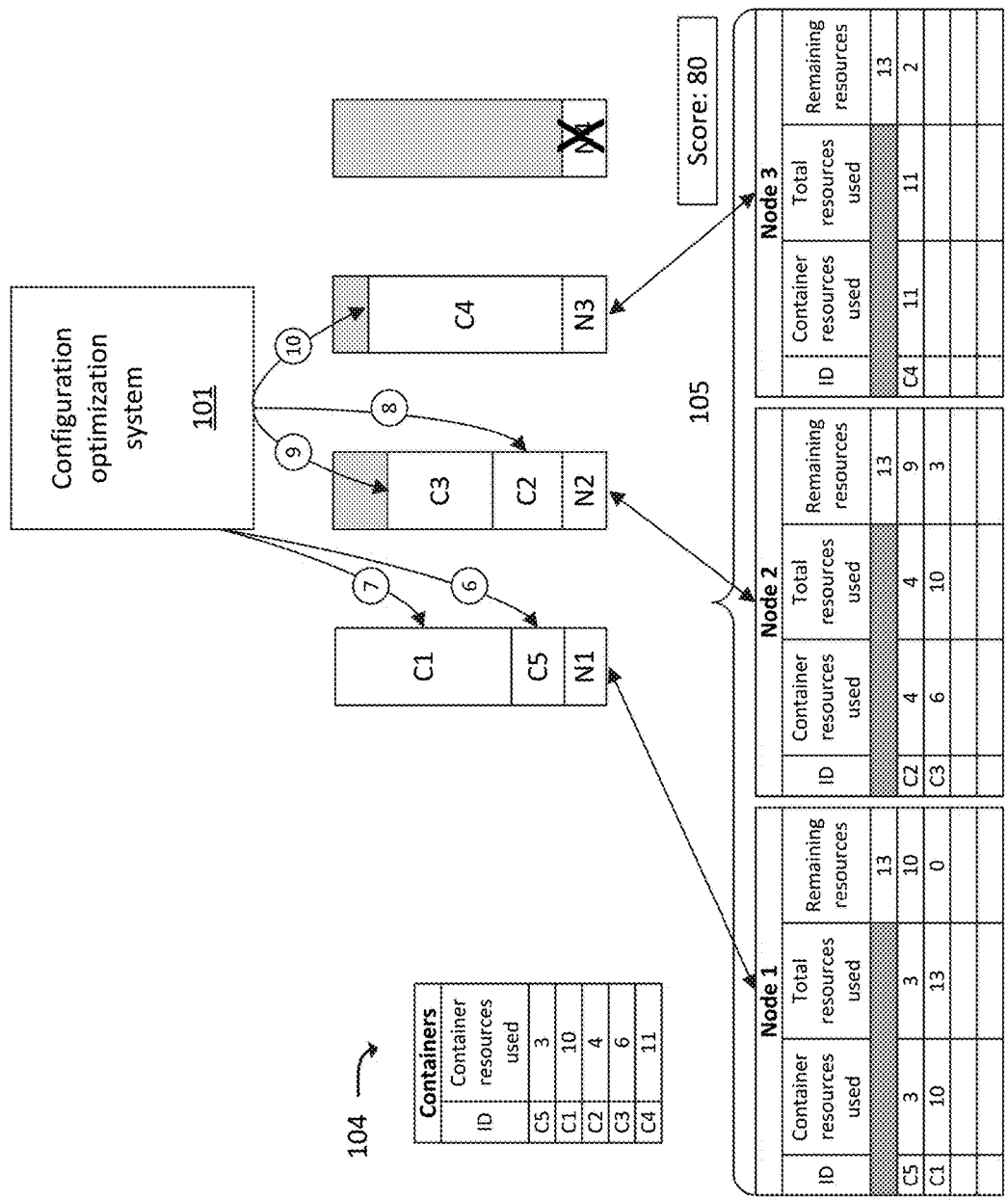

As shown in FIGS. 1A and 1B, for example, COS 101 may utilize a "stacking" methodology to place containers into nodes. While discussed in the context of containers being placed onto nodes, embodiments described herein may refer to the simulation of placing containers onto nodes (e.g., results of the simulation may be able to be determined without actually placing containers onto nodes). "Stacking" may involve, for example, generating or identifying an ordered list of containers to place in a set of nodes, and placing each container in a node, in the order identified in the list. If a given node is unable to accept the next container (e.g., if one or more required resources, associated with the container, is not available on the node, etc.), then the next node may be selected for that particular container, and stacking may continue in this next node (and so on). According to this methodology, placement may repeat until all containers are placed in a node. Once each container is placed (e.g., when a particular configuration is generated for the set of containers and nodes), a new iteration may begin with a new container stacking order (e.g., to generate another configuration). As described below, a container order may be modified according to a random order, a shift in order (e.g., starting with a different node), and/or some other change in order.

As shown in FIG. 1A, COS 101 may place containers C1-C5 in nodes in accordance with the order displayed in container list 102 (i.e., C1, C2, C3, C4, and then C5) according to stacking techniques. The iteration shown in FIG. 1A may place these containers onto a set of candidate nodes (i.e., N1, N2, N3, and N4, in this example). As described herein, each node may be associated with a particular set of resources. Nodes may be described or referred to as having a "resource score," which may be a score that is derived from, and/or otherwise reflects, an amount of resources associated with each node. For example, an overall resource score may be based on all of the resources associated with a given node, such as processor resources, memory resources, storage resources, etc. As another example, a particular resource score for a given node may reflect only a particular resource, or only a subset of the resources associated with the node (e.g., processing resources and/or memory resources, but not storage resources, etc.). Resource scores, as discussed herein, may have values that are different from the resources indicated by the resource scores. For example, a node with 32 GB of memory may have a resource score of 10, while a node with 64 GB of memory may have a resource score of 12. In the example of FIGS. 1A and 1B, all of the candidate nodes have the same resources (and the same resulting overall resource score). In practice, and as elaborated on further below, similar concepts may apply for nodes with varying levels of available resources.

Containers may also have resource scores, indicating resources used by, required by, and/or otherwise associated with containers. For instance, the resource score for C1 (as indicated in ordered list 102) may be 10, the resource score for C2 may be 4, and so on. As with the resource scores for nodes, the resource scores for containers may be derived from or based on some or all of the resources that are required by and/or or used by the containers.

In the example of FIG. 1A, each available node (i.e., N1-N4) may contain the same number of available resources, and may thus have the same resource score (i.e., 13 in this example). Configuration 103 indicates a solution to container placements in these nodes using a stacking methodology with the placement order (e.g., as indicated in ordered list 102). For example, COS 101 may place (at 1) C1 in N1, using 10 of the available 13 resources (leaving 3 remaining available resources on N1). Since the second container to be placed, C2 (with a resource score of 4) cannot fit in N1 (i.e., the resource score, or the required resources, of C2 is higher than the available resources of N1), COS 101 may place C2 in N2. Thus, as shown, COS 101 may place (at 2) container C2 and may place (at 3) container C3 in N2, thus utilizing a total of 10 of the 13 available resources of N2. Further, since COS 101 is unable to place container C4 into N2 (as N2 does not have enough resources available to place container C4), COS 101 may proceed to place C4 on N3, and C5 on N4 using similar concepts as described above, until all containers are placed.

While shown in this example as placing C5 onto N4, in some embodiments, COS 101 may place C5 onto N1 (not illustrated). For example, COS 101 may determine whether a node, on which containers have been previously placed, has space to accommodate a given container before placing the container on another node, and/or adding another node to the configuration. In this example, C5 has a resource score of 3, and the resource score of N1 (after placement of C1) is also 3. In this example, C1 and C5 may be placed onto N1, fully utilizing resources of N1, according to the methodology used to generate this particular resource score.

As further shown in FIG. 1A, after generating a configuration (such as configuration 103), COS 101 may generate one or more configuration scores for the configuration. As shown in FIG. 1A, for example, configuration 103 may receive a configuration score of 20. Scoring may occur based on one or more criteria, such as resource utilization (e.g., amount of resources used and/or left unused by a given configuration), node utilization (e.g., the number of nodes utilized by the configuration, etc.), and/or other criteria. For example, a configuration where available resources of a set of nodes are fully utilized may receive a more optimal (e.g., higher) configuration score than a configuration which leaves some resources of one or more nodes unused. In some embodiments, a configuration in which nodes have a remaining score exceeding a threshold may receive a higher configuration score. A threshold may indicate, for example, a preference for a node to leave a resource remaining above the threshold so that it may be utilized in the future. In other words, for example, leaving a relatively small amount of available resources (as compared to the amount of resources typically used by a container) may reflect a relatively small likelihood that another container would be able to utilize these resources in the future, while leaving an amount of resources that are generally close to the amount of resources that are used or required by containers may reflect a relatively larger likelihood that another container would be able to utilize these resources in the future.

For example, the threshold may be based on an average resource score associated with placed resources and/or a minimum resource that may be placed. In some embodiments, the threshold may be based on machine learning and/or other techniques used to identify a suitable threshold (e.g., relatively common or frequent amount of resources used by containers). For example, if COS 101 only places containers with a resource requirement (e.g., resource score) exceeding 3, the threshold may be set at 3 (e.g., configuration with nodes which have a remaining resource score below 3 may score lower than configurations with nodes exceeding a resource score of 3), and/or the threshold may reflect that remaining resource scores having a multiple of 3 are preferred to resource scores having multiples other than 3. In some embodiments, a configuration may be scored based on the number of nodes utilized. For example, a configuration may receive a more optimal (e.g., higher) configuration score because it utilized fewer nodes compared to another configuration. While shown as a numerical value, a configuration score may be represented by other scales, for example, a classification rating (e.g., grade A, grade B, etc.) and/or other ratings.

FIG. 1B illustrates another example iteration of placing the same containers C1-C5 onto the same nodes N1-N4, in which placement may occur according to a new container order as illustrated in container list 104 (i.e., C5, C1, C2, C3, and then C4) utilizing a stacking methodology. While container list 104 is shown to shift the starting container (as compared to container list 102, shown in FIG. 1A), the placement order may be modified differently (e.g., random order, decreasing numerical order, etc.) in different iterations. Configuration 105, shown in FIG. 1B, may be created as a result of the different stacking order (e.g., compared to container list 102). As shown in FIG. 1B, COS 101 may place (at 6) C5 and may place (at 7) C1 in N1. COS 101 may place (at 8) C2 and may place (at 9) C3 in N4. COS 101 may place (at 10) C4 in node N3. As illustrated, as a result of the shift in the container placement order (i.e., as shown in container list 104), one fewer node may be used in comparison to configuration 103. For example, a fourth node (e.g., N4) may not be used in configuration 105 (as denoted in the figure by the "X" overlaid over N4).

As discussed above, after generating configuration 105, COS 101 may generate one or more configuration scores associated with configuration 105 based on one or more criteria. As shown in FIG. 1B, for example, configuration 105 may receive a configuration score of 80. In some embodiments, this higher configuration score, associated with configuration 105, than the score for configuration 103 (shown in FIG. 1A) may cause configuration 105 to be selected in response to a request for a configuration based on requested configuration parameters or criteria, as discussed further below. The higher configuration score for configuration 105, in this example, may be based on the use of fewer nodes (i.e., three nodes in the example iteration shown in FIG. 1B than the four nodes in the example iteration shown in FIG. 1A) than configuration 103.

Figure 2A:
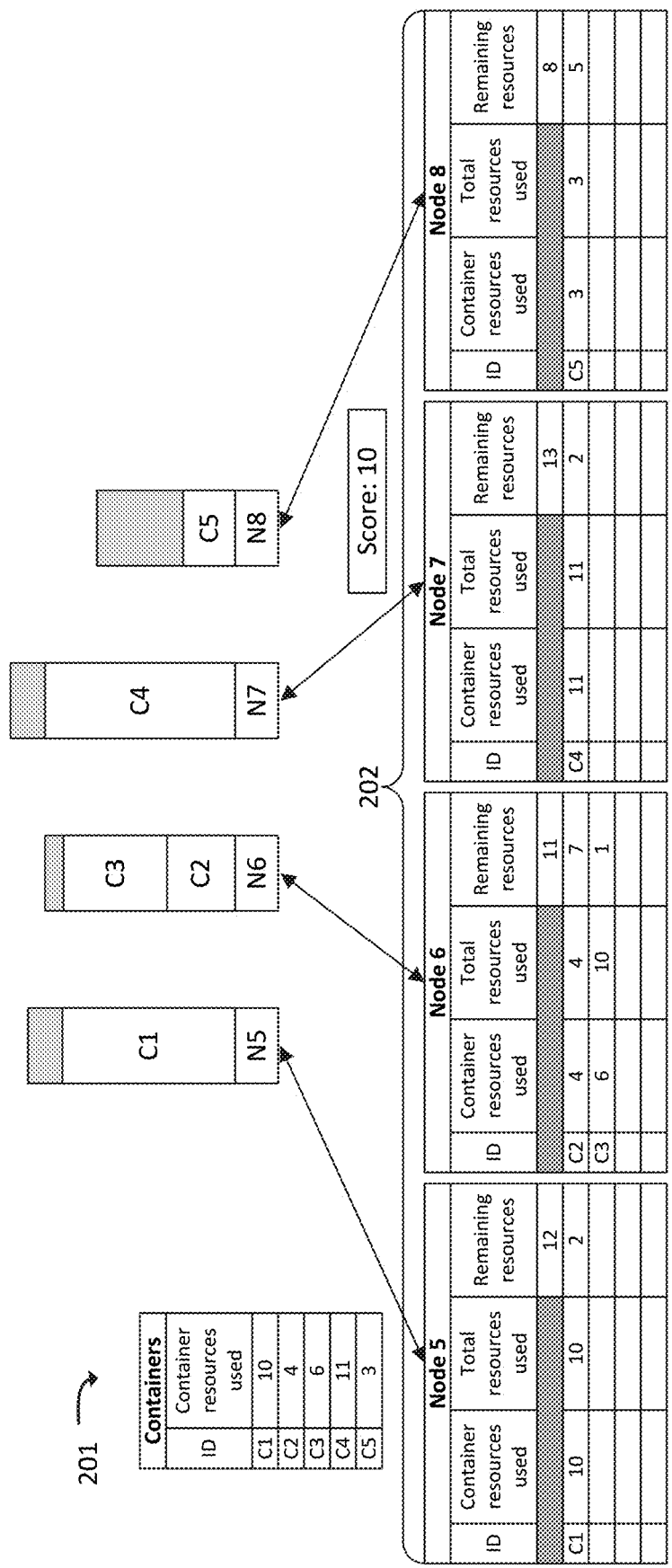
FIGS. 2A and 2B illustrate the example generation of a set of VM configurations on nodes of with varying amounts of available resources, in accordance with embodiments described herein.
Figure 2B:
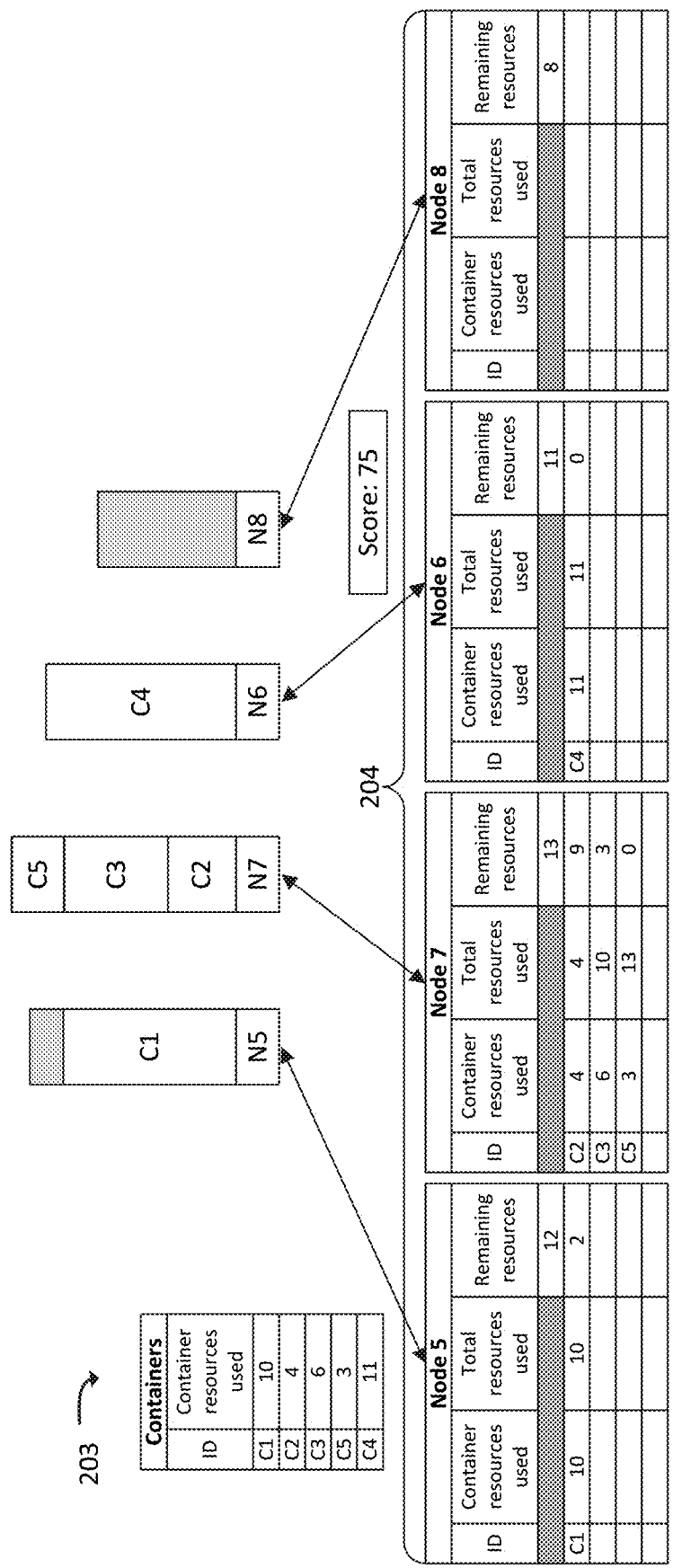

As shown in FIGS. 2A and 2B, COS 101 may place containers into nodes of varying sizes. In these figures, a "stacking" methodology is shown; in practice, similar concepts may apply using other types of methodologies (e.g., "spreading," as described below, and/or some other methodology). Generating and scoring configurations with containers of varying sizes may expand the variety of configurations that can be optimized and provided in response to a request that includes configuration parameters of a desired configuration (e.g., which specifies one or more attributes of nodes on which to place containers).

As shown in FIG. 2A, COS 101 may place containers C1-C5 in nodes in accordance with container list 201, which indicates a container placement order of C1, C2, C3, C4, and then C5. In this example, COS 101 may determine a node placement order of nodes N5, N6, N7, and then N8. In other iterations, COS 101 may determine a different node placement order, or nodes of different attributes, while retaining the same container placement order. Configuration 202 indicates a solution to container placements in these nodes using a stacking methodology with the placement order (e.g., as indicated in container list 201). As shown, in configuration 202, N5 has a starting resource score of 12 (e.g., where the resource score indicates, is derived from, and/or is otherwise based on one or more available resources of N5), N6 has a starting resource score of 11, N7 has a starting resource score of 13, and N8 has a starting resource score of 8. COS 101 may place C1 into N5, utilizing 10 of the available 12 resources (e.g., where the installation or instantiation of C1 on N5 causes N5's resource score, indicating available resources, to be reduced from 12 to 2). In accordance with the "stacking" methodology, COS 101 may be unable to place C2 in N5, as there are insufficient resources remaining in N5 to place C2 (i.e., C2 is associated with a resource score of 4 while N5 has an available resource score of 2). Thus, COS 101 may begin placement in N6, including placing C2 and C3 (utilizing 10 of the available 11 resources in N6). As shown, COS 101 may place container C4 in N7 (utilizing 11 of the available 13 resources) and place container C5 in N8 (utilizing 3 of the available 8 resources).

FIG. 2B illustrates a further example of stacking methodology in nodes of different sizes. As shown, FIG. 2B illustrates containers list 203 (containing the same containers as containers list 201, but in the order of C1, C2, C3, C5, and then C4) and nodes N5-N8 (containing the same starting resources as in FIG. 2A), however, the order in which nodes are stacked is modified (i.e., N7 and N6 switch placement order, creating an order of N5, N7, N6, and then N8). Configuration 204 may indicate a solution to container placements in these nodes using a stacking methodology with the placement order (e.g., as indicated in container list 203).

As illustrated in FIGS. 2A and 2B, the container placement order and node order may be modified. In some embodiments, the node order may be modified while the container placement order remains static. In some embodiments, the node order may remain static while the container placement order is modified. In accordance with "stacking," COS 101 places C1 in N5, using 10 of the available 12 resources, places C2, C3, and C5 in N6, using all 13 available resources, and places C4 in N7, using all 11 available resources. As shown, configuration 204 does not utilize N8, which may be a factor in the higher configuration score for configuration 204 than for configuration 202.

In some embodiments, different iterations may be generated and/or scored in a random fashion, and/or a sequential fashion (e.g., placing nodes in different sequences, moving the first node to the end of the list in subsequent iterations). In some embodiments, different iterations may be generated and/or scored based on machine learning and/or other suitable techniques. For example, COS 101 may identify configurations with relatively high configuration scores (e.g., as compared to other configurations with the same containers to place), and may identify characteristics of these configurations, including resource scores of placed containers, sequences in which the containers are placed, resource scores of nodes on which the containers are placed, and/or sequences of nodes on which the containers are placed. When generating new configurations, COS 101 may generate configurations that share these characteristics before generating configurations that differ from these characteristics.

For example, COS 101 may identify that a set of configurations, in which containers are placed in the order C1, C3, C5, C2, and then C4, tend to have higher configuration scores (e.g., an average, median, or other measure of the scores) than a set of configurations in which containers are placed in the order C5, C4, C3, C2, and then C1. Thus, in subsequent iterations, COS 101 may generate and score configurations based on the order C1, C3, C5, C2, and then C4 (e.g., using this same order, or with variations based on this order) before generating and scoring configurations based on the order C5, C4, C3, C2, and then C1. Additionally, or alternatively, COS 101 may generate and score configurations in a weighted manner, in which COS 101 generates and scores more configurations that are based on the order C1, C3, C5, C2, and then C4 than configurations that are based on the order C5, C4, C3, C2, and then C1.

In some embodiments, COS 101 may generate configuration information (e.g., configuration parameters) based on applications currently in use. For example, COS 101 may generate configuration parameters (e.g., resources, identifications, etc. associated with nodes and/or containers) based on a user-created configuration. In some embodiments, configuration generation may occur based on frequently used nodes and/or containers. For example, if a certain set of nodes and/or containers are frequently used, COS 101 may determine parameters that are the same and/or similar to that set of frequently used nodes and/or containers and generate configurations based on those parameters. In some embodiments, configuration parameters may be determined based on predicted uses, which may be determined based on, for example, configurations or configuration parameters that were used in the past.

COS 101 may, in some embodiments, determine configuration parameters based on trends associated with previous configurations, such as an increase and/or decrease in the number of and/or resources associated with nodes and/or containers. For example, if COS 101 determines a trend of a 10% increase in the number of resources utilized by one or more particular containers, COS 101 may generate parameters reflecting that 10% increase and generate configurations accordingly. Similarly, COS 101 may determine an increase in available resources associated with nodes and generate configuration parameters reflecting that increase in available resources.

In some embodiments, placement techniques may ignore configurations which are incompatible. For example, if there was a container order of C1, C2, C3, C5, and then C4 into a node order of N5, N6, N7, and N8 (as shown in FIG. 2A), COS 101 may be unable to place all containers in nodes (e.g., placing container C5 in N7 would not leave enough resources (i.e., only 10 resources would remain in N7) to place container C4 (with a resource score of 11) in N7, and further could not place container C4 in N8, as N8 only has 8 starting resources). Therefore, COS 101 may not score and/or store this configuration. Additionally, or alternatively, COS 101 may store information indicating that this configuration is unusable, and/or may provide this configuration with a low or zero configuration score.

Figure 3A:
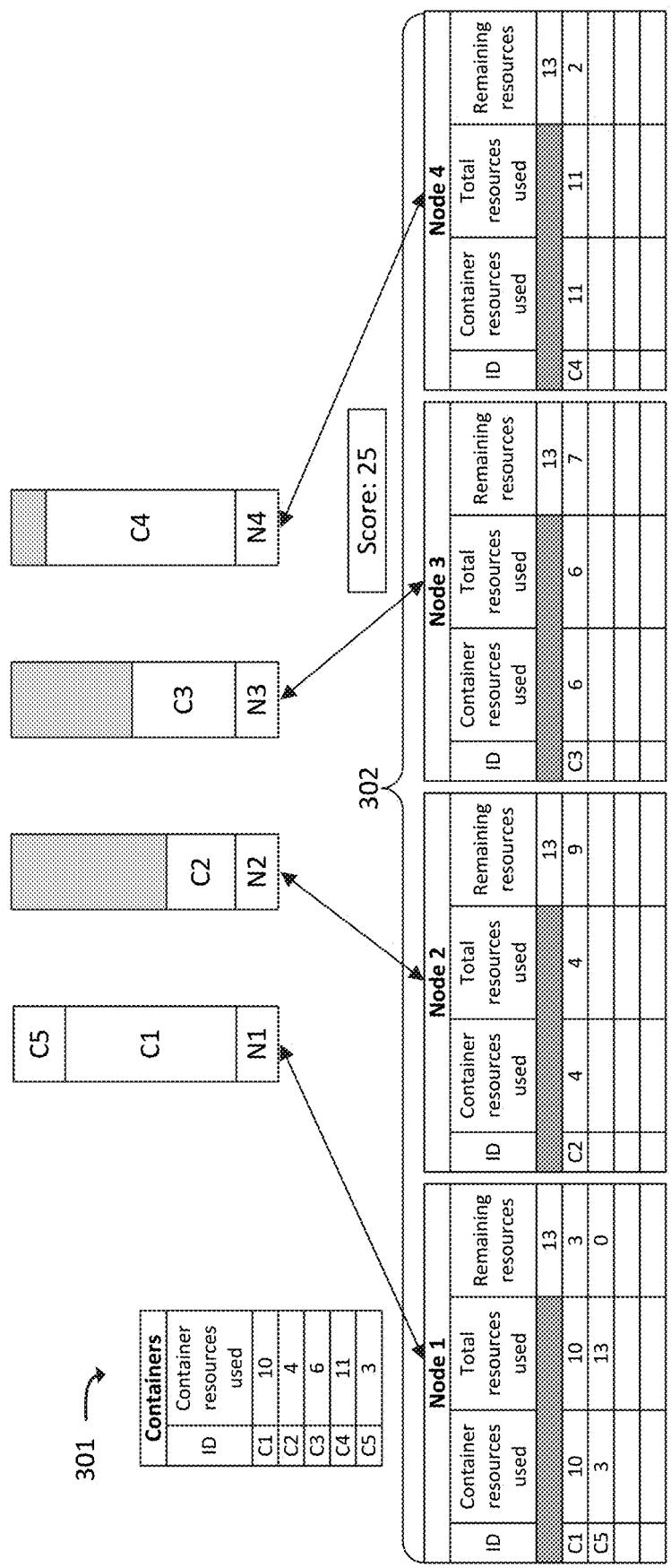
FIGS. 3A and 3B illustrate the example generation, using a "spreading" methodology in accordance with embodiments described herein, of a set of VM configurations.
Figure 3B:
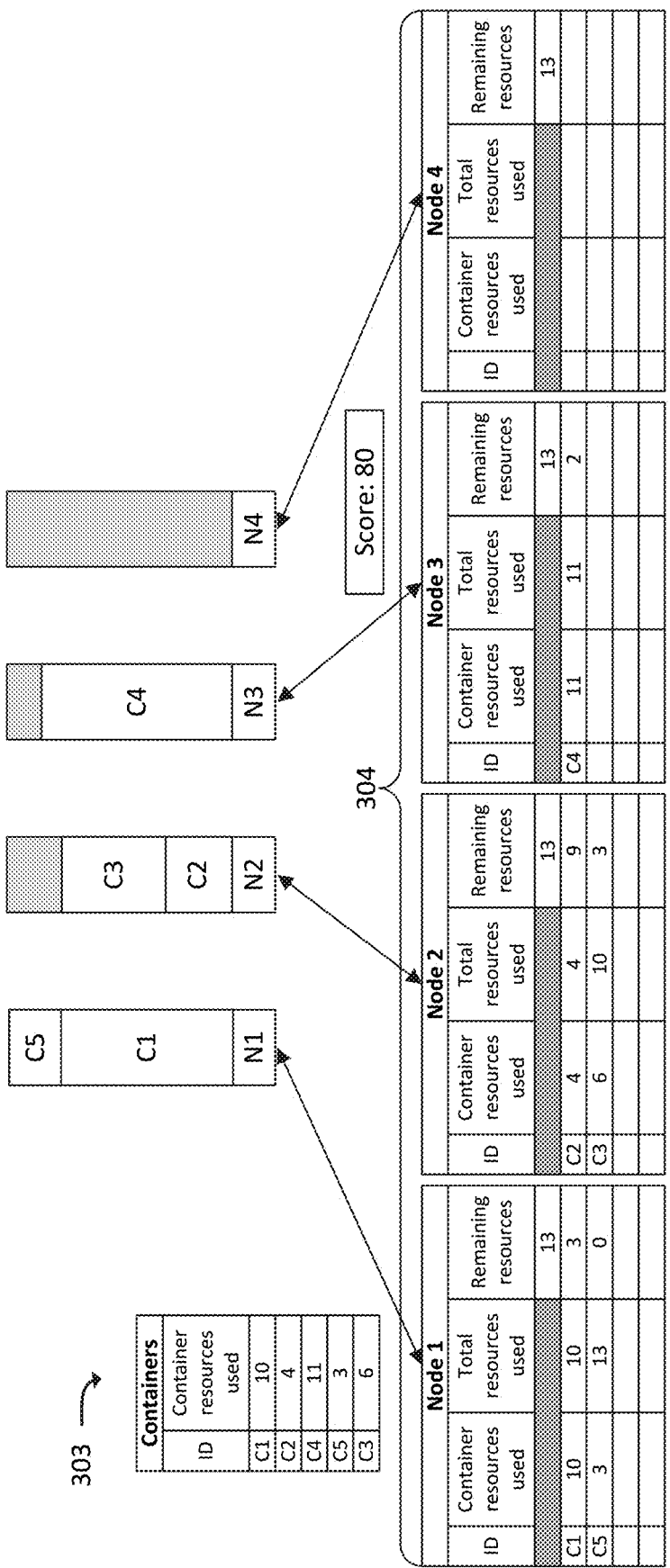

As a further example of placement rules, FIGS. 3A and 3B illustrate a "spreading" methodology. "Spreading" may involve, for example, generating or identifying an ordered list of containers and/or nodes and placing one container in each available node, in accordance with the node list, until all nodes contain one container, and then placing an additional container in each available node, in accordance with the node order, until all containers are placed. A node may become unavailable, as discussed above, if the node does not have the resources necessary to place a container, and/or is otherwise unable to accept a container.

As shown in FIG. 3A, for example, COS 101 (not shown) may place containers C1-C5 in nodes in according to a "spreading" methodology. As illustrated in FIG. 3A, COS 101 may generate container list 301 for placement in nodes N1-N4 (each containing 13 resources, as in FIGS. 1A and 1B). Configuration 302 indicates a solution to container placements in these nodes using a spreading methodology with the placement order (e.g., as indicated in container list 301). As shown in configuration 302, COS 101 may place C1 in N1, C2 in N2, C3 in N3, and C4 in N4. According to "spreading," as all nodes have one container placed, the next container (i.e., here, C5) may be placed in the first node in the node order (i.e., here, N1).

In some embodiments, a "spreading" methodology may include prioritizing unfilled nodes containing at least one container. As illustrated in FIG. 3B, for example, COS 101 may organize C1-C5 in a different placement order (e.g., as shown in container list 303, C1, C2, C4, C5, and then C3) for placement in nodes N1-N4. Configuration 304 indicates a solution to container placements in these nodes using a spreading methodology. For example, COS 101 may place C1 in N1 and may place C2 in N2. COS 101 may be unable to place C4 in either N1 or N2 (e.g., N1 and N2 do not individually contain enough remaining resources to place C4), therefore, COS 101 may place C4 in N3. According to this methodology, COS 101 may determine whether any node, containing at least one container, is able to accept the next container (C5). While in this example COS 101 may place C5 in either N1 or N2, COS 101 may place C5 in N1 based on the node order (i.e., N1, N2, and then N3). Following a similar methodology, COS 101 may place C3 in N2.

In some embodiments (not depicted), COS 101 may follow both stacking and spreading techniques to place containers in nodes. In such embodiments, for example, COS 101 may place containers according to spreading techniques (e.g., one container in each available node) and, upon placing one container in each node, place remaining nodes in containers according to stacking techniques. For example, in an embodiment where some containers utilize a large amount of resources (e.g., have a resource score above a threshold score), COS 101 may spread each container into nodes and subsequently stack remaining, smaller containers (e.g., containers which have a resource score below a threshold score), in each of those nodes. As another example, a given configuration may include a set quantity of nodes. COS 101 may spread that quantity (or a multiple of the quantity, and/or some other number based on the quantity) of containers onto the nodes, and may stack the remaining containers. For instance, when generating a configuration with four nodes, COS 101 may spread the four most resource-intensive containers across the four nodes, and may stack the remaining containers on the four modes in accordance with a stacking methodology.

In some embodiments, some containers may be placed according to stacking techniques and some placed according to spreading techniques. For example, COS 101 may stack each node until each node reaches a certain resource score, at which time COS 101 spreads the remaining containers across the remaining nodes.

In some embodiments, COS 101 may store information regarding multiple types of resources used by different sets of containers. For example, as shown in FIGS. 4A and 4B, multiple types of resources (shown as "Resource 1," "Resource 2," and "Resource 3") may be identified and/or scored for each node and container placed. These types of resources may include processor resources, memory resources, storage resources, network resources, and/or other types of resources used by containers and/or nodes. While shown in FIGS. 4A and 4B to contain three types of resources, in practice, fewer or more resources may be managed in each configuration. In some embodiments, an overall resource score may be indicated in addition to one or more resources.

FIG. 4A illustrates an example configuration based on container list 401 following a stacking methodology. As shown, container list 401 includes details for resources 1-3 in addition to an overall resource score associated with each container C1-C5. As shown, nodes N1-N4 each contain 13 resources of each type (resources 1-3). Configuration 402 indicates a solution to container placements in these nodes using a stacking methodology with the placement order (e.g., as indicated in container list 401).

As shown in FIG. 4A (i.e., in configuration 402), COS 101 may place, according to stacking, C1 and C2 in N1. COS 101 may place C3 in N2. As shown, COS 101 cannot stack C4 in N3, based on insufficient resources (i.e., as shown, not enough of resources 1 and 3), and therefore, COS 101 may place C4 in N3. COS 101 cannot place C5 in N3, and thus COS 101 places C5 in N4.

As further shown in FIG. 4A, in some embodiments, a configuration may be scored based on each resource utilized in the configuration and/or an overall resource score. For example, as shown, configuration 402 receives a score for each resource (i.e., of resources 1-3) based on one or more factors (e.g., as discussed above, resource utilization, and/or other factors). Configuration 402 may also receive an overall configuration score based on factors, such as individual scores for each resource, node utilization (e.g., quantity of nodes used in the configuration, and/or a measure of overall resources associated with the nodes used in the configuration, and/or other factors). In some embodiments, individual resource scores may impact the overall configuration score based on a weighted scale. For example, the resource score for resource 3 may impact the overall configuration score more than the resource scores associated with resource 1 and/or resource 2, etc.

In some embodiments, spreading methodology may be utilized to place containers into nodes when managing multiple resources. For example, as shown in FIG. 4B, COS 101 may generate configuration 404 using a spreading methodology using containers C1-C5 in container list 403 and nodes N1-N4 (with 13 resources for each resource 1-3).

While illustrated in FIGS. 4A and 4B as utilizing one methodology (e.g., stacking and/or spreading, etc.) at one time to determine configurations, it is contemplated that multiple methodologies may be utilized in combination. For example, in some embodiments, COS 101 may generate a configuration by stacking according to one resource score (e.g., where a placement order for containers is determined based on ranking the resource scores of one resource type) while spreading via another resource score. In some embodiments, COS 101 may generate a configuration by prioritizing the utilization of a particular resource. For example, COS 101 may optimize (e.g., utilize the maximum available in each node) the usage of processing power while not optimizing memory usage when generating a configuration.

Figure 5:
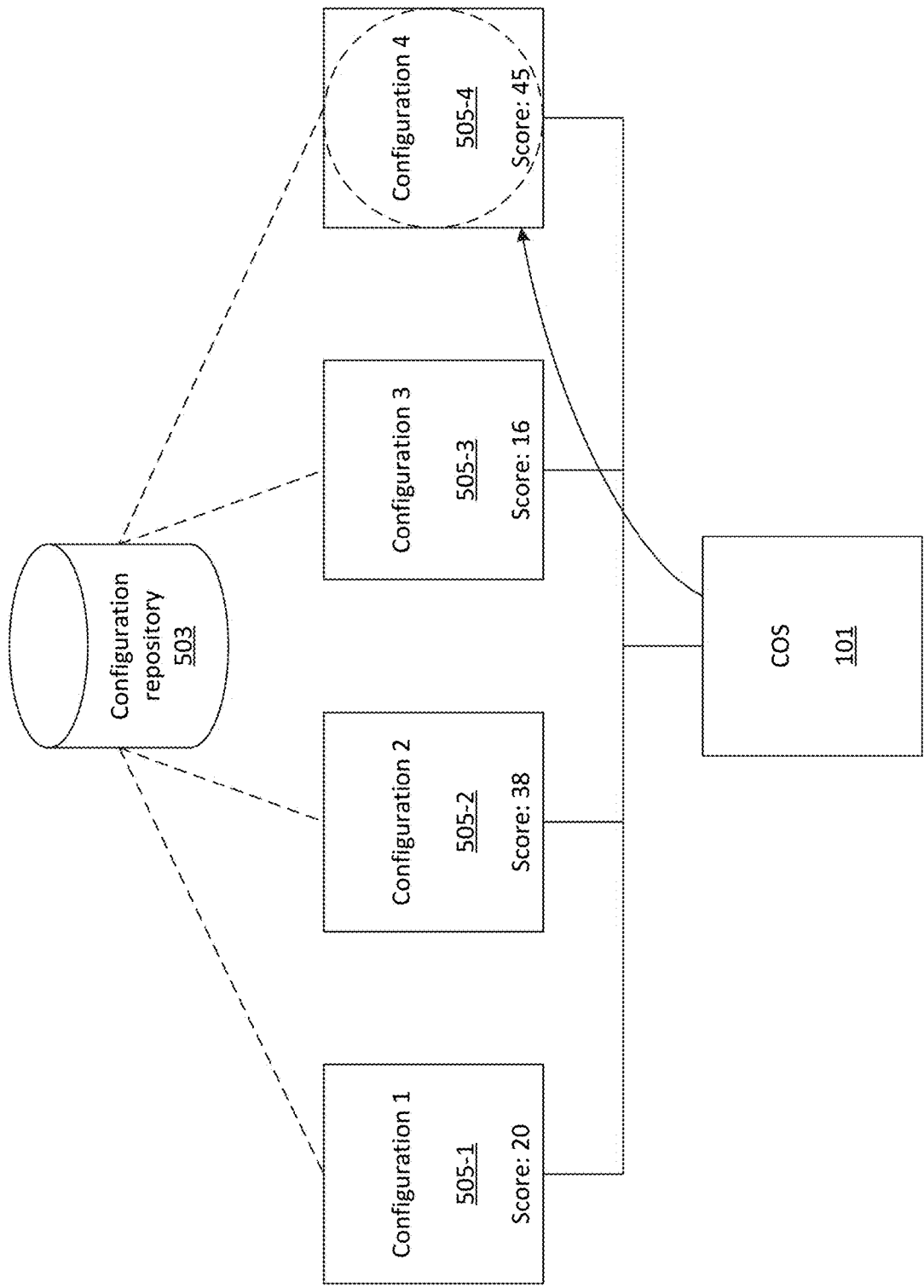
FIG. 5 illustrates an example selection of a VM configuration, in accordance with embodiments described herein.

Once configurations are generated, COS 101 may choose from the available configurations, in order to fulfill a request for a configuration that matches (or most closely matches) a set of input parameters (e.g., specifying parameters of containers to instantiate on one or more nodes, parameters associated with the set of nodes, one or more types or resources to optimize and/or other criteria specifying how to rank or score configurations, etc.). For example, as shown in FIG. 5, COS 101 may receive several configurations (e.g., as shown configurations 505-1-505-4) from configuration repository 503. Some or all of the configurations, stored in configuration repository 503, may have been generated and/or scored by COS 101 (e.g., as similarly discussed above). As discussed above, each configuration may be associated with one or more configuration scores. In some embodiments, COS 101 may rank configurations based on their configuration scores and select a configuration based on the ranking (e.g., a configuration with a highest configuration score) to fulfill a request for a configuration. As discussed below, a particular configuration score, out of a set of configuration scores for each configuration, may be used to select a particular configuration. For example, the input parameters may specify that CPU resources should be optimized. COS 101 may thus rank configurations according to scoring of CPU resources (e.g., in a manner similar to that discussed above with respect to FIGS. 4A and 4B) when selecting a particular configuration to provide in response to the request.

Figure 6:
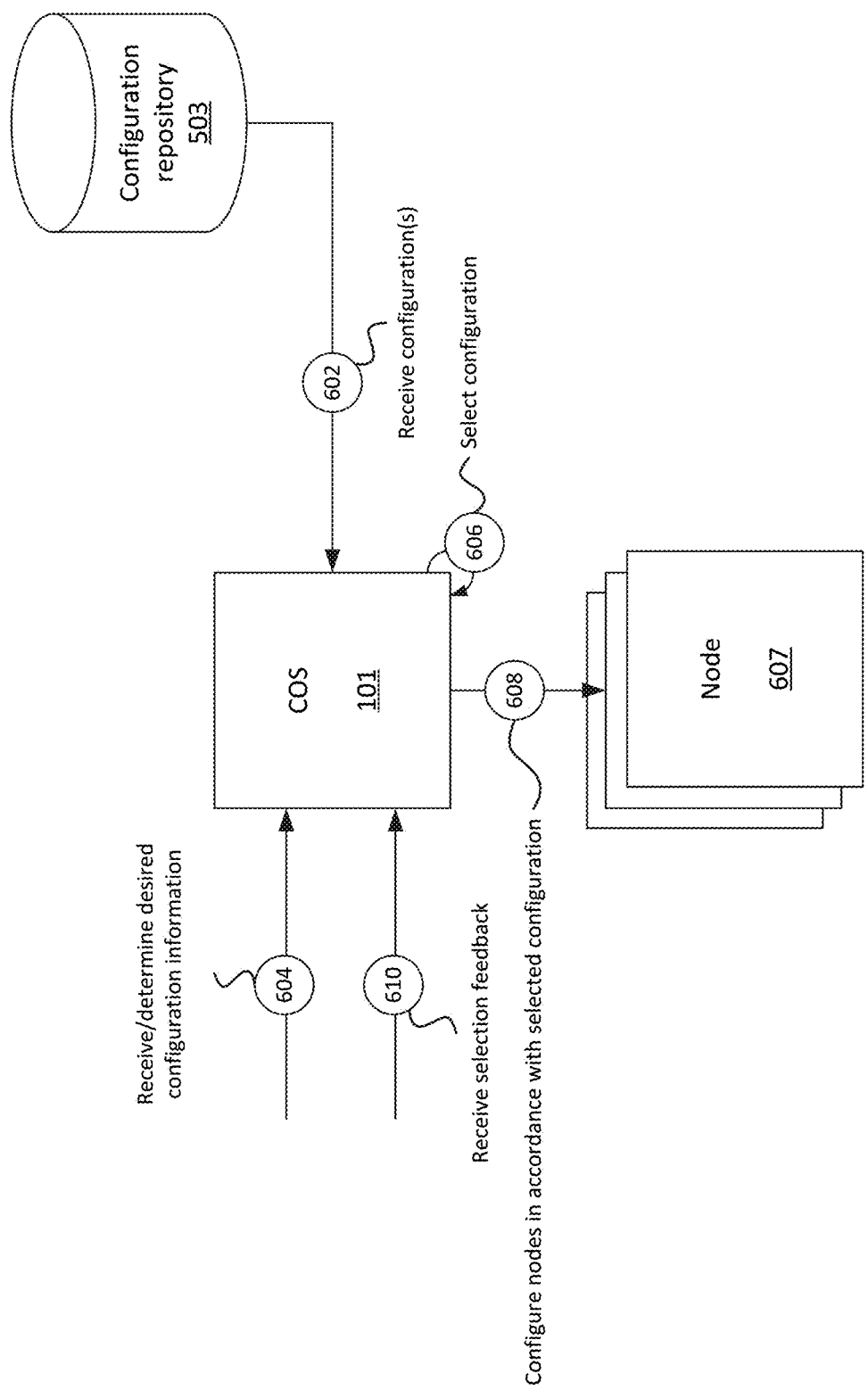
FIG. 6 illustrates an example of selecting and configuring a particular VM configuration, based on input configuration parameters, out of a set of candidate configurations (e.g., as generated and/or scored in accordance with some embodiments)

FIG. 6 illustrates an example of selecting and configuring a particular configuration, based on input configuration parameters, out of a set of candidate configurations. As shown in FIG. 6, for example, COS 101 may receive (at 602) a set of configurations from configuration repository 503. As described above, configuration repository 503 may maintain information regarding several configurations, including one or more configuration scores associated with each configuration (e.g., as determined by COS 101).

As further shown in FIG. 6, COS 101 may receive and/or determine (at 604) configuration information indicating parameters of a desired configuration. The parameters of the desired configuration may include information regarding one or more containers to be placed in one or more nodes. In some embodiments, the configuration information may specify attributes of the nodes in which to place the containers, such as the quantity of nodes, resources associated with the nodes, etc. In some embodiments, COS 101 may have access to a pool or set of candidate nodes 607, on which one or more containers may be instantiated (and/or may have access to a cluster or other set of resources, on which nodes 607 can be provisioned). In some embodiments, nodes 607 may be, and/or may implement, components of a network (e.g., a Software-Defined Network ("SDN")), such as a wireless network (e.g., a Fifth Generation ("5G") network). In some embodiments, COS 101 may determine a set of parameters based on a received set of nodes and/or containers. For example, COS 101 may utilize machine learning techniques to determine parameters based on similar sets of nodes and/or containers which were previously configured. In some embodiments, COS 101 may determine configuration information based on a configuration in use. In such an embodiment, COS 101 may receive a configuration of nodes and containers and determine attributes associated with the nodes and/or containers. For example, COS 101 may analyze one or more currently existing or installed configurations (e.g., determine a configuration score for an existing configuration), in order to optimize the currently existing configuration based on a corresponding configuration generated by COS 101, which may have a more favorable (e.g., higher) configuration score than the existing configuration.

In some embodiments, the parameters of the desired configuration may include additional configuration criteria, such as an indication that a particular type of resource (e.g., processing resources, memory resources, storage resources, etc.) should be optimized, an indication that the fewest nodes as possible should be used, an indication that the fewest amount of cumulative resources across selected nodes should be provisioned for the configuration, and/or other criteria or combinations of criteria.

In some embodiments, COS 101 may use a generated configuration to "resize" one or more nodes or containers (e.g., nodes and/or containers in existing configurations). "Resizing" nodes and/or containers may include, for example, increasing and/or decreasing the resources associated with a container and/or a node based on one or more factors. For example, containers and/or nodes may be resized based on efficiency with a node and/or container (e.g., the resources utilized by a container may decrease when placed in a particular arrangement, etc.), based on scaling factors (e.g., an over-provisioning and/or an under-provisioning of resources associated with a node and/or container, etc.), and/or some other factors. In some embodiments, COS 101 may resize containers based on available node resources and/or a resize range associated with a container (e.g., a limitation for an increase or decrease in the resource utilization of a container). These limitations may be explicitly indicated (e.g., in metadata associated with containers), and/or may have been determined based on machine learning or other suitable techniques (e.g., an analysis of varying levels of resources used for containers having one or more similar or common attributes).

For example, assume a particular node in a configuration has an amount of a particular resource equivalent to a resource score of 5, and a container placed in the particular node causes the remaining resource score for this particular resource to be reduced to 1 (e.g., consumes an amount of this particular resource equivalent to a resource score of 4). In another manner of considering this example, the particular node may have 5 Terabytes ("TB") of total storage space, and a particular container placed on the node (according to a given configuration) may consume 4 TB of storage space, leaving 1 TB of storage space remaining on the node. In such an instance, COS 101 may resize the container to utilize the additional 1 TB of storage space when placing the container in the particular node. For example, COS 101 may modify the container to utilize 5 TB of storage space, instead of 4 TB.

Similarly, in some situations, the resources associated with a container may be decreased. Assume that a particular container is associated with a range and/or minimum value for a given resource. For example, the particular container may be associated with a storage space of 4 TB, but may also be associated with a minimum storage space of 2 TB. Referring again to the example of this container being placed on a node with 5 TB of total storage space, COS 101 may reduce the storage space associated with the container, so that the remaining storage space associated with the node is greater than 1 TB (i.e., where 1 TB would be left over if the container, utilizing 4 TB of storage space, were placed on the node with 5 TB of total storage space).

For example, COS 101 may utilize machine learning and/or other techniques to determine the amount to reduce the container's resources by, and/or to determine the amount of resources to leave available after resizing. For instance, COS 101 may analyze a set of configurations (e.g., as generated by COS 101, and/or existing or currently installed configurations) to determine an amount of resources that are likely to be useful or usable. Based on the analysis of configurations, COS 101 may determine that a remaining storage space of 2.7 TB would be likely to be usable by another container (e.g., containers that are likely to be installed on the node may consume or require up to 2.7 TB of storage space). This analysis may include analyzing other configurations to determine particular containers placed on the nodes in these configurations, and determining other containers that are included in the same node and/or configuration as the particular containers. As such, based on this determination, COS 101 may resize the container from utilizing 4 TB of storage space to 2.3 TB of storage space. This resizing would result in the container utilizing at least its minimum storage space of 2 TB, and would also result in the node having 2.7 TB of storage space available (e.g., available for the installation of one or more other containers).

As further shown in FIG. 6, COS 101 may select (at 606) a configuration from the provided configurations. COS 101 may compare the desired configuration information, including any criteria, to the provided configuration. COS 101 may rank each configuration based on the associated configuration score and/or similarity to the criteria (e.g., based on a suitable similarity analysis). In some embodiments, COS 101 may reject (i.e., not select from) a configuration which does not satisfy the desired configuration information. In some embodiments, the selection may be modified based on machine learning techniques. Machine learning techniques may enhance selection by analyzing feedback to determine a confidence level associated with a selection. For example, COS 101 may maintain and/or refine predictive models associated with each configuration (e.g., to strength or weaken a correlation between a given configuration and the received configuration information). Predictive models may contain, for example, information regarding previous selection of the configuration (e.g., the configuration information used to previously select a configuration). Feedback may be used to modify one or more predictive models. For example, feedback indicating a correct selection based on the same/similar information may strengthen or increase the association of the selected configuration with the criteria or parameters used to select the configuration, whereas feedback indicating an incorrect selection based on the same/similar information may weaken or decrease this association. As described below, different feedback may modify the score differently (e.g., higher confidence feedback may impact a score more than lower confidence feedback).

As described above, selection information (e.g., received at 604) may include additional criteria to select a configuration. For example, selection information may include an indication to utilize the fewest number of nodes (e.g., optimize the number of nodes utilized). As described above, each node may represent a discrete set of hardware resources. The optimization of the number of nodes may reduce the hardware requirements for the placement of containers. As described above, some configurations may utilize fewer nodes compared to other configurations when utilizing the same nodes and/or containers. For example, as shown in FIG. 1A, configuration 103 may utilize four nodes. In contrast, as shown in FIG. 1B, configuration 105 may utilize three nodes (e.g., as described above, as indicated by the "X" covering N4 in FIG. 1B). As such, configuration 105 may be selected over configuration 103 when configuration information indicates using the fewest number of nodes.

In some embodiments, selection information may include an indication to optimize a particular resource. As described above, one or more resources may be identified and/or scored for each placed node and/or container. For the sake of example, assume an indication to optimize based on a first resource type, and a first node has a high starting resource score for the first resource type (indicating a high amount of the first resource) and a second node has a low starting resource score for the first resource type (indicating a lower amount of the first resource compared to the first node). Assume further that all containers to be placed may be placed in either the first node or the second node. A configuration utilizing the second node to place all containers may be selected over a configuration utilizing the first node to place all containers because the second node may optimize the first resource type. In other words, a configuration utilizing the second node would leave fewer unused resources of the first resource type. In some embodiments, configuration information may include an indication to optimize more than one resource in order. Assume for the sake of example that three resource types (e.g., Resource 1, Resource 2, and Resource 3) are scored and/or identified. The received configuration information may indicate to optimize Resource 1, then Resource 3, and then Resource 2. Selection may occur based on this prioritization for resource optimization. This prioritization may occur, for example, in embodiments where multiple nodes have high starting resource scores.

In some embodiments, configuration information may indicate the selection of a configuration utilizing the fewest amount of cumulative resources across all nodes in the configuration. This selection criteria may, for example, indicate a selection of a configuration wherein the nodes are full (e.g., the resources associated with each node in the configuration are utilized). In some embodiments, a selection based on this configuration information may utilize many nodes with relatively small resource capacity rather than fewer relatively large resource capacity nodes. For the sake of example, assume a first configuration utilizes a single node with a resource score of 20 to place a set of containers using 13 resources, and a second configuration utilizes two nodes with a total resource score of 14 to place the same set of containers using 13 resources. Given an indication to select a configuration based on utilizing the fewest amount of cumulative resources, COS 101 may select the second configuration (i.e., two nodes with a total resource score of 14) despite utilizing two nodes rather than one.

In some embodiments, COS 101 may, on an ongoing basis, select a configuration based on a configuration currently in use. For example, COS 101 may analyze a previously configured set of nodes and containers to determine a mismatch with the highest scoring configuration. In such embodiments, COS 101 may select the highest scoring configuration based on the resources associated with nodes and/or containers and/or other parameters. In other words, COS 101 may rebalance a current configuration to better utilize resources in accordance with select parameters.

As further shown in FIG. 6, COS 101 may configure (e.g., install, instantiate, etc.) (at 608) the selected configuration onto node(s) 607 (e.g., each node). COS 101 may configure the selected configuration by utilizing an API (e.g., Kubernetes API, etc.). In some embodiments, COS 101 may be communicatively coupled with another device, such as an orchestration system, which may instantiate the containers of the configuration onto the node and/or may provision the nodes from a cluster of available resources according to the selected configuration. In such embodiments, COS 101 may provide instructions to an orchestration system on how to configure the nodes and/or the cluster of available resources.

COS 101 may receive (at 610) feedback regarding the configured configuration (e.g., from 610). Feedback may be utilized to enhance future selection via machine learning techniques based on the provided feedback, the confidence associated with the feedback, and/or other factors. For example, in some embodiments, a user associated with COS 101 may select a different configuration and/or provide feedback regarding the configuration selection after COS 101 selected (e.g., at 606) a configuration based on provided configuration information (e.g., from 604). For example, a user associated with COS 101 may select a different configuration than a configuration selected by COS 101. This user selection may indicate that the user-selected configuration is more suitable than the configuration selected by COS 101 (e.g., the user-selected configuration better matches the provided configuration information). In some embodiments, a user may modify a selected configuration (e.g., a user may switch, remove, replace, and/or otherwise modify nodes and/or containers in a configuration). Such a modification may indicate that the modified configuration is more suitable than the unmodified configuration selected by COS 101. Modified and/or user-selected configurations may be configured onto nodes (e.g., as described above, in regard to 610). In such embodiments, where a user modifies and/or selects a different configuration, COS 101 may store information regarding the configuration selection to provide user-reinforced feedback regarding the selection. User-reinforced feedback may be used to enhance future configuration selection with a high level of confidence. Different levels of confidence may indicate, for example, the degree to which a predictive model is modified. Feedback with a relatively high degree of confidence, for example, may impact a predictive model more heavily than feedback with relatively a low degree of confidence.

In some embodiments, a user may provide feedback affirming the selection of a particular configuration. The feedback may include explicit affirmative feedback, such as an affirmative answer when prompted whether the selection was accurate or satisfactory. In some embodiments, the feedback may include one or more actions based on which feedback may be inferred, such as proceeding to use and/or not change the selected configuration within a threshold period of time (e.g., indicating that the user was satisfied with the selection and therefore did no change the configuration). When receiving feedback affirming the selection of a particular configuration, COS 101 may strengthen predictive models associated with that selection. In other words, given the same and/or similar configuration information, COS 101 would be more likely to choose the same configuration. If a user provides a selection rejecting the selection made by COS 101 (e.g., an explicit indication that the selection was not satisfactory, such as a response to a prompt asking if the selection was satisfactory or accurate, or an action based on which feedback may be inferred, such as modifying the selection within a threshold period of time), COS 101 may be less likely to choose a configuration given the same and/or similar configuration information.

Figure 7:
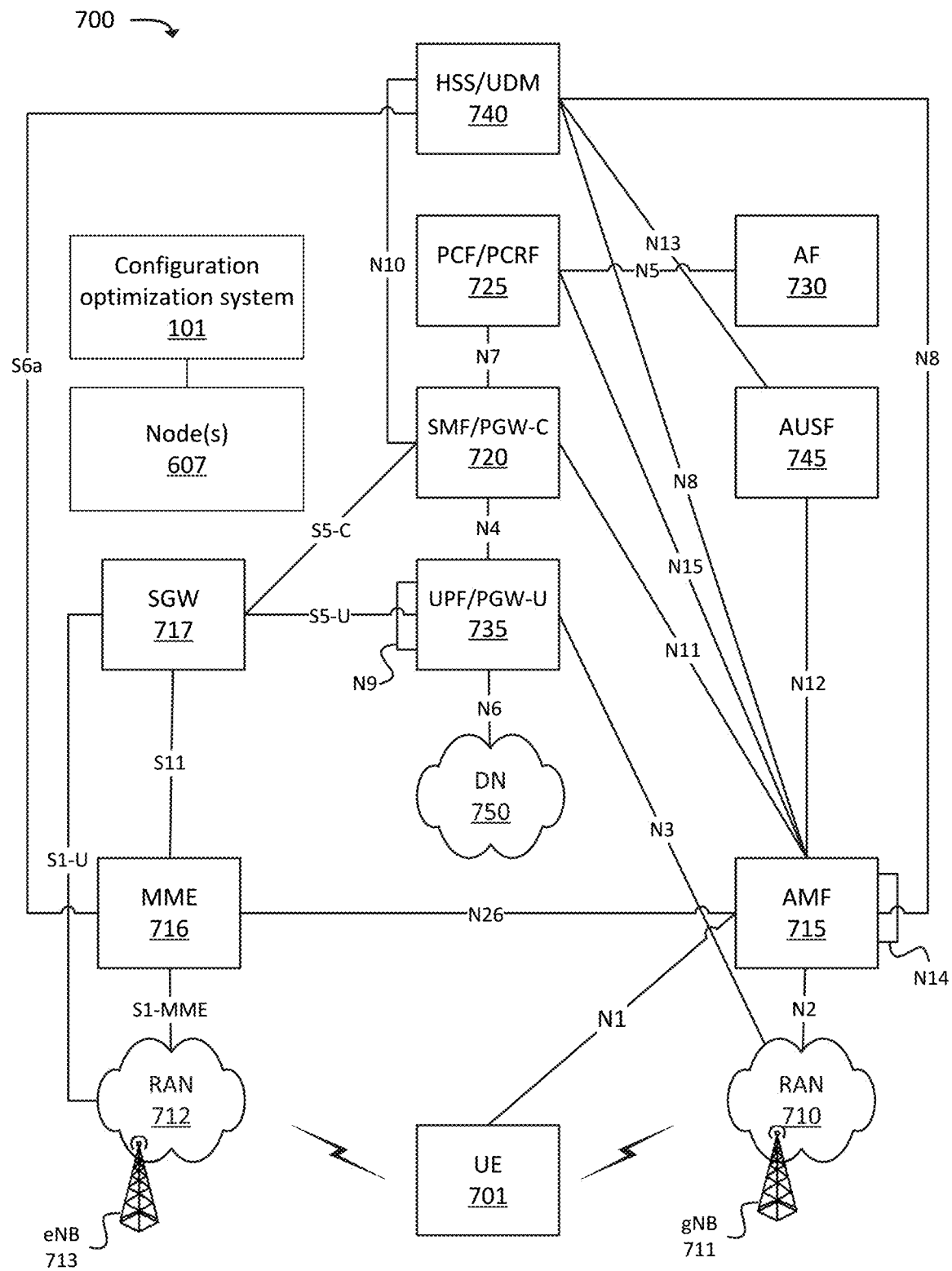
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, radio access network ("RAN") 710 (which may include one or more Next Generation Node Bs ("gNBs") 711), RAN 712 (which may include one or more one or more evolved Node Bs ("eNBs") 713), AMF 715, SMF/PGW-Control plane function ("PGW-C") 720, PCF/Policy Charging and Rules Function ("PCRF") 725, AF 730, UPF/PGW-User plane function ("PGW-U") 735, HSS/UDM 740, AUSF 745, Data Network ("DN") 750, and COS 101.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. As mentioned above, some or all of the devices and/or components of environment 700 may include, and/or may be implemented by, one or more nodes 607 in a virtualized and/or cloud computing environment. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710 and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 701 may send traffic to and/or receive traffic (e.g., user plane traffic) from DN 750 via RAN 710 and UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, an LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 517, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, and/or to perform other operations. In some embodiments, the 5G network may include multiple AMFs 715, which communicate with each other via the N14 interface (denoted in FIG. 7 by the line marked "N14" originating and terminating at AMF 715).

SGW 517 may include one or more devices, systems, VNFs, etc., that aggregate traffic received from one or more eNBs 713 and send the aggregated traffic to an external network or device via UPF/PGW-U 735. Additionally, SGW 517 may aggregate traffic received from one or more UPF/PGW-Us 735 and may send the aggregated traffic to one or more eNBs 713. SGW 517 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

COS 101 may include one or more devices or systems that perform one or more operations described herein. For example, COS 101 may communicate with one or more of the devices, systems, VNFs, or networks shown in FIG. 7, may generate configurations (e.g., using machine learning and/or other techniques), and may configure, install, instantiate, etc. nodes and/or containers in accordance with a selected configuration. As mentioned above, COS 101 may include, or may be communicatively coupled to, an orchestration system that is capable of receiving information (e.g., diagnostic or monitoring information) from the devices or systems shown in FIG. 7, and is capable of installing or instantiating containers on nodes (e.g., as implemented by physical or virtual hardware). While no explicit connections are shown between COS 101 and other devices or systems of environment 700, COS 101 may, in some embodiments, be communicatively coupled to some or all of the devices or systems of environment 700. In some embodiments, the same devices, nodes, clusters, etc., that implement one or more of the devices or systems of environment 700 may implement some or all of the functionality of COS 101.

Figure 8:
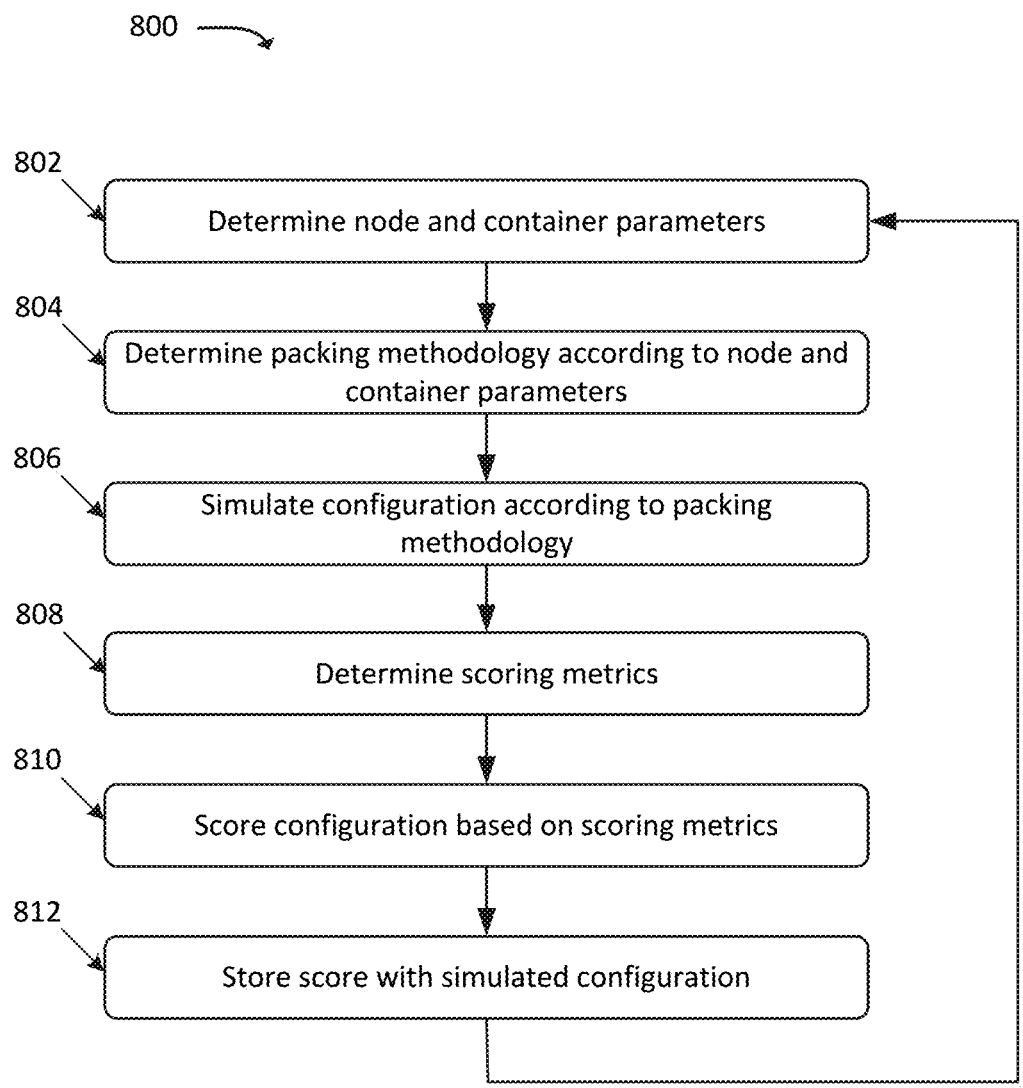
FIG. 8 illustrates an example process for generating one or more VM configurations, in accordance with some embodiments.

FIG. 8 illustrates an example process 800 for generating configurations, in accordance with some embodiments. In some embodiments, some or all of process 800 may be performed by COS 101. In some embodiments, one or more other devices may perform some or all of process 800 (e.g., in concert with, and/or in lieu of, COS 101).

As shown, process 800 may include determining (at 802) container and node parameters for configuration generation. As described above, such parameters may include information regarding the nodes and/or containers, such as resources associated with containers and/or nodes and/or other information. As described above, configuration parameters may be based on current applications in use and/or may be generated based on predicted future use. In some embodiments, configuration parameters may be generated (e.g., using random resource information, based on predicted usage, etc.) for configuration creation.

Process 800 may further include determining (at 804) a packing methodology to use when generating (and/or simulating the generation of) configurations. As discussed above, the packing methodology may include stacking, spreading, a combination of both, and/or some other suitable methodology or combination) utilized to generate a configuration. In some embodiments, determining packing methodology may include determining a container order and/or a node order. In some embodiments, determining the packing methodology may include determining criteria such as optimizing a particular resource, optimizing the number of nodes used, simulation length (e.g., limiting the time to simulate a configuration), number of configurations to simulate, and/or other criteria.

Process 800 may further include simulating (at 806) a configuration according to packing methodology. As described above, a configuration may be simulated by placing (e.g., according to stacking and/or spreading methodologies, etc.) containers onto nodes.

Process 800 may also include determining (at 808) scoring metrics associated with the generated (or simulated) configurations. Scoring metrics may include criteria by which to score the configuration. As described above, for example, a configuration may be scored based on the number of resources utilized (e.g., resources remaining and/or used, etc.), the number of nodes utilized, and/or other scoring factors.

Process 800 may also include scoring (at 810) the configuration. Scoring may occur based on determined scoring metrics (e.g., from 808). Scoring may occur, for example based on a numerical rating, a classification rating (e.g., grade A, grade B, etc.), and/or other ratings. COS 101 may, in some embodiments, generate multiple scores for each configuration, where each score is based on different scoring metrics. The different scores, according to the different scoring metrics, may be used in the selection of a particular configuration to provide in response to a request that specifies one or more parameters to be prioritized. For example, a request that specifies optimization of processor resources may cause COS 101 to identify a particular configuration based on the scores (e.g., a configuration that has a highest score) that were generated based on processor resources utilized.

Process 800 may further include storing (at 812) the configuration with the related score. In some embodiments, the configuration may be stored with related score(s) in a repository (e.g., configuration repository 503) and/or some other data structure capable of maintaining configuration information. In some embodiments, the provision may further provide details regarding the configuration information utilized to create the configuration.

As shown in FIG. 8, once information regarding a configuration is provided, portions of process 800 (e.g., some or all of blocks 802-812) may iteratively repeat in order to generate one or more configurations, which may use the same or different configuration parameters (e.g., as received at 802). In some embodiments, configuration information may limit the number of configurations to generate based on a configuration limitation (e.g., limit the number of configurations to generate), timing (e.g., generate for a limited time period), and/or other restrictions.

Figure 9:
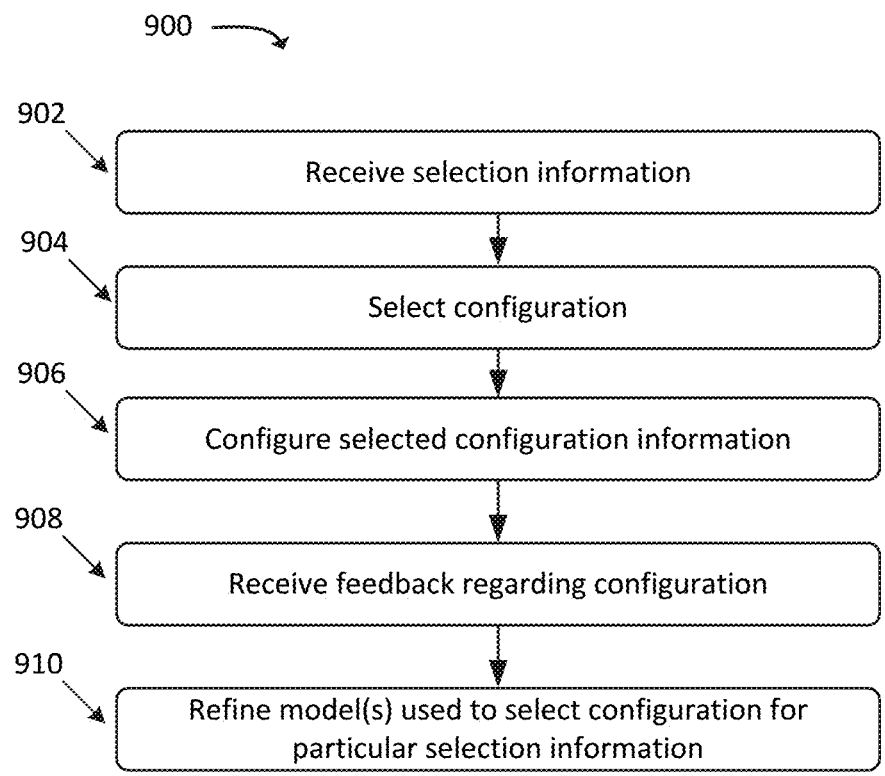
FIG. 9 illustrates an example process for selecting and configuring a VM configuration, in accordance with some embodiments.

FIG. 9 illustrates an example process of selecting and configuring a configuration in response to a request for a configuration. Process 900 may generally correspond, for example, to a situation in which a set of containers are to be placed into a set of nodes. For example, a user may desire to place the set of containers onto a predetermined set of nodes, and/or onto an optimal set of nodes as indicated by a particular configuration that has been generated by COS 101. In some embodiments, some or all of process 900 may be performed by COS 101. In some embodiments, one or more other devices may perform some or all of process 900 (e.g., in concert with, and/or in lieu of, COS 101).

Process 900 may include receiving (at 902) selection information. As described above, selection information may include container and/or node information. In some embodiments, selection information may include additional criteria (e.g., optimize a particular resource, optimize number of nodes, etc.).

Process 900 may additionally include selecting (at 904) a configuration. As described above, COS 101 may receive a set of configurations (e.g., from configuration repository 503) and one or more score associated with each configuration of the set of configurations. As described above, a configuration may be chosen based on an associated score. For example, a configuration may be selected because the configuration has the highest score for the selection parameters (e.g., received at 902). In some embodiments, a similarity analysis may be performed between the selection information (received at 902) and the one or more configurations stored in configuration repository 503, in order to identify a particular configuration that has a highest degree of similarity to the selection information. As discussed above, one or more machine learning techniques may have been used to correlate attributes of selection information to attributes of one or more configurations.

Process 900 may also include configuring (at 906) the node in accordance with the selected configuration. As described above, COS 101 may configure (e.g., install, instantiate, etc.) and/or may provide instructions to another device to configure nodes and/or containers.

Process 900 may include receiving (at 908) feedback regarding the configuration. As discussed above, feedback may enhance future configuration selection based on previous use (e.g., utilizing machine learning techniques). In some embodiments, explicit feedback may be received from a user (e.g., providing relatively high degree of confidence, as discussed above). In some embodiments, feedback may be inferred by the absence of explicit feedback from a user (e.g., providing relatively low degree of confidence, as discussed above).

Process 900 may further include refining (at 910) one or more models that were used to select the particular configuration for the selection information. For example, based on the feedback, COS 101 may determine whether the selection (at 904) of the particular configuration was accurate or otherwise appropriate for the selection information (received at 902). COS 101 may refine the association or correlation of some or all of the selection information to the particular configuration that was selected, based on the feedback (received at 908).

Figure 10:
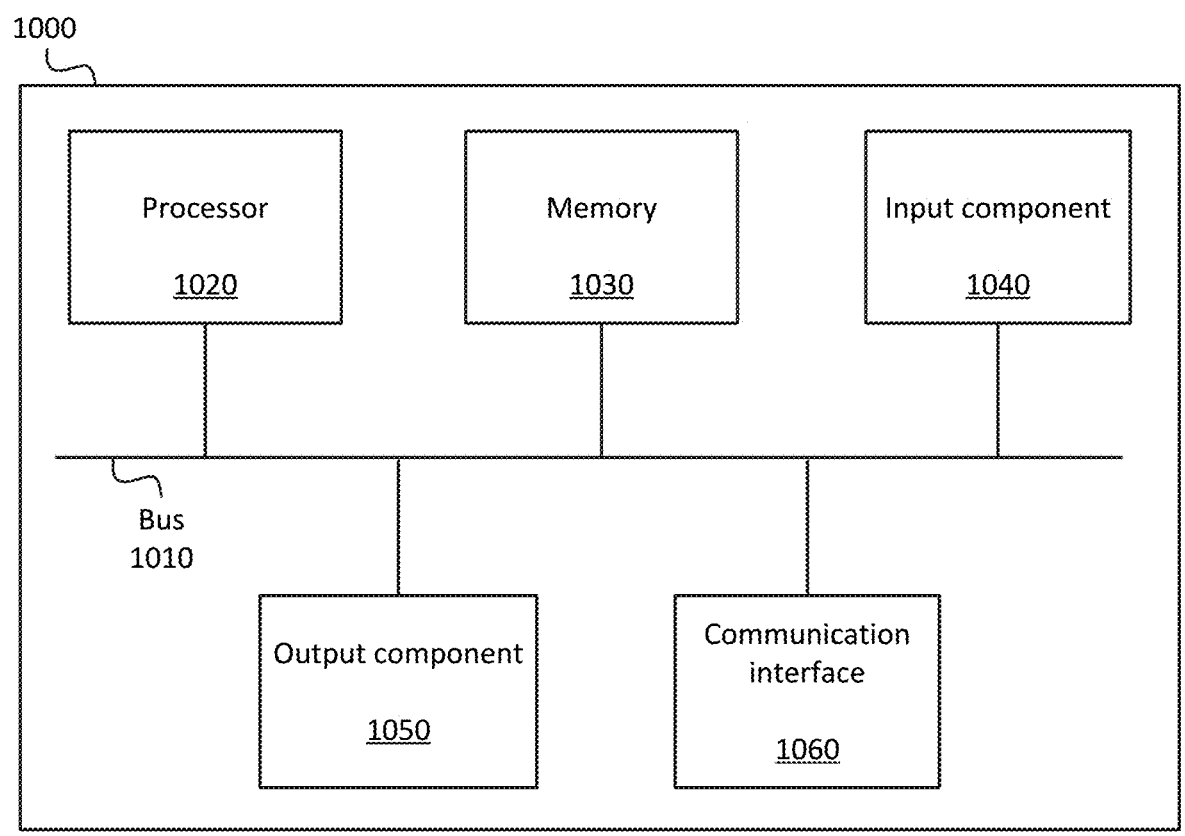
FIG. 10 illustrates example functional components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, "containers" and "nodes" are used herein to describe "bins" and "infrastructures," which may be interpreted to include additional virtualized environments.

For example, while series of blocks and/or signals have been described above (e.g., with regard to FIGS. 1A and 1B, 6, 8, and 9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive information regarding a first set of nodes associated with a virtualized environment, the information for each node indicating a set of resources associated with the each node;
   receive information regarding a first set of containers to place in the first set of nodes, the information for each container indicating a set of resources utilized by the each container;
   generate a plurality of candidate configurations based on performing a plurality of iterations of simulating placement of the first set of containers in the first set of nodes, wherein generating a particular candidate configuration based on performing a particular iteration of placing the first set of containers in the first set of nodes includes:
      determining a particular packing methodology, out of a plurality of packing methodologies, to use when placing the first set of containers in the first set of nodes, wherein different iterations of the simulating include using different packing methodologies;
      simulating the placement of the first set of containers in the first set of nodes according to the determined particular packing methodology; and
      generating one or more scores for the candidate configuration based on utilization, of the resources associated with the first set of nodes;
   receive a request to place a second set of containers in a second set of nodes;
   select a particular configuration, from the plurality of candidate configurations, based on scores for the generated plurality of candidate configurations and based on a comparison of the second set of containers to the first set of containers; and
   place the second set of containers in the second set of nodes based on the particular configuration.

2. The device of claim 1, wherein a first packing methodology, for a first iteration of the plurality of iterations, is different from a second packing methodology used for a second iteration of the plurality of iterations.

3. The device of claim 2, wherein the first packing methodology includes:
   placing containers, of the first set of containers, into a first node of the first set of nodes in a sequence until the resources of the first node cannot accommodate a next container in the sequence; and
   placing the next container into a second node of the first set of nodes based on the resources of the first node not being able to accommodate the next container.

4. The device of claim 3, wherein the sequence is a first sequence, wherein the second packing methodology includes:
   placing containers, of the first set of containers, into the first node of the first set of nodes in a second sequence, that is different from the first sequence, until the resources of the first node cannot accommodate a next container in the second sequence; and
   placing the next container, of the second sequence, into the second node of the first set of nodes based on the resources of the first node not being able to accommodate the next container of the second sequence.

5. The device of claim 3, wherein the second packing methodology includes:
   placing containers, of the first set of containers and according to the sequence, into the second node until the resources of the second node cannot accommodate a next container in the sequence; and
   placing the next container into the first node based on the resources of the second node not being able to accommodate the next container.

6. The device of claim 1, wherein the one or more scores, for the candidate configuration, include:
   a first score associated with utilization of a first type of resource associated with the first set of nodes, and
   a second score associated with utilization of a second type of resources associated with the first set of nodes.

7. The device of claim 6, wherein the request specifies an indication to prioritize the first type of resources, wherein the particular configuration is selected from the plurality of candidate configurations based on the first score associated with the particular configuration.

8. A non-transitory computer-readable medium, storing a plurality of processor-executable instructions to:
receive information regarding a first set of nodes associated with a virtualized environment, the information for each node indicating a set of resources associated with the each node;
receive information regarding a first set of containers to place in the first set of nodes, the information for each container indicating a set of resources utilized by the each container;
generate a plurality of candidate configurations based on performing a plurality of iterations of simulating placement of the first set of containers in the first set of nodes, wherein generating a particular candidate configuration based on performing a particular iteration of placing the first set of containers in the first set of nodes includes:
determining a particular packing methodology, out of a plurality of packing methodologies, to use when placing the first set of containers in the first set of nodes, wherein different iterations of the simulating include using different packing methodologies;
simulating the placement of the first set of containers in the first set of nodes according to the determined particular packing methodology; and
generating one or more scores for the candidate configuration based on utilization, of the resources associated with the first set of nodes;
receive a request to place a second set of containers in a second set of nodes;
select a particular configuration, from the plurality of candidate configurations, based on scores for the generated plurality of candidate configurations and based on a comparison of the second set of containers to the first set of containers; and
place the second set of containers in the second set of nodes based on the particular configuration.

9. The non-transitory computer-readable medium of claim 8, wherein a first packing methodology, for a first iteration of the plurality of iterations, is different from a second packing methodology used for a second iteration of the plurality of iterations.

10. The non-transitory computer-readable medium of claim 9, wherein the first packing methodology includes:
placing containers, of the first set of containers, into a first node of the first set of nodes in a sequence until the resources of the first node cannot accommodate a next container in the sequence; and
placing the next container into a second node of the first set of nodes based on the resources of the first node not being able to accommodate the next container.

11. The non-transitory computer-readable medium of claim 10, wherein the sequence is a first sequence, wherein the second packing methodology includes:
placing containers, of the first set of containers, into the first node of the first set of nodes in a second sequence, that is different from the first sequence, until the resources of the first node cannot accommodate a next container in the second sequence; and
placing the next container, of the second sequence, into the second node of the first set of nodes based on the resources of the first node not being able to accommodate the next container of the second sequence.

12. The non-transitory computer-readable medium of claim 10, wherein the second packing methodology includes:
placing containers, of the first set of containers and according to the sequence, into the second node until the resources of the second node cannot accommodate a next container in the sequence; and
placing the next container into the first node based on the resources of the second node not being able to accommodate the next container.

13. The non-transitory computer-readable medium of claim 8, wherein the one or more scores, for the candidate configuration, include:
a first score associated with utilization of a first type of resource associated with the first set of nodes, and
a second score associated with utilization of a second type of resources associated with the first set of nodes.

14. The non-transitory computer-readable medium of claim 13, wherein the request specifies an indication to prioritize the first type of resources, wherein the particular configuration is selected from the plurality of candidate configurations based on the first score associated with the particular configuration.

15. A method, comprising:
receiving information regarding a first set of nodes associated with a virtualized environment, the information for each node indicating a set of resources associated with the each node;
receiving information regarding a first set of containers to place in the first set of nodes, the information for each container indicating a set of resources utilized by the each container;
generating a plurality of candidate configurations based on performing a plurality of iterations of simulating placement of the first set of containers in the first set of nodes, wherein generating a particular candidate configuration based on performing a particular iteration of placing the first set of containers in the first set of nodes includes:
determining a particular packing methodology, out of a plurality of packing methodologies, to use when placing the first set of containers in the first set of nodes, wherein different iterations of the simulating include using different packing methodologies;
simulating the placement of the first set of containers in the first set of nodes according to the determined particular packing methodology; and
generating one or more scores for the candidate configuration based on utilization, of the resources associated with the first set of nodes;
receiving a request to place a second set of containers in a second set of nodes;
selecting a particular configuration, from the plurality of candidate configurations, based on scores for the generated plurality of candidate configurations and based on a comparison of the second set of containers to the first set of containers; and
placing the second set of containers in the second set of nodes based on the particular configuration.

16. The method of claim 15, wherein a first packing methodology, for a first iteration of the plurality of iterations, is different from a second packing methodology used for a second iteration of the plurality of iterations.

17. The method of claim 16, wherein the first packing methodology includes:

placing containers, of the first set of containers, into a first node of the first set of nodes in a sequence until the resources of the first node cannot accommodate a next container in the sequence; and placing the next container into a second node of the first set of nodes based on the resources of the first node not being able to accommodate the next container.

18. The method of claim 17, wherein the sequence is a first sequence, wherein the second packing methodology includes:

placing containers, of the first set of containers, into the first node of the first set of nodes in a second sequence, that is different from the first sequence, until the resources of the first node cannot accommodate a next container in the second sequence; and placing the next container, of the second sequence, into the second node of the first set of nodes based on the resources of the first node not being able to accommodate the next container of the second sequence.

19. The method of claim 15, wherein the one or more scores, for the candidate configuration, include:

a first score associated with utilization of a first type of resource associated with the first set of nodes, and a second score associated with utilization of a second type of resources associated with the first set of nodes.

20. The method of claim 19, wherein the request specifies an indication to prioritize the first type of resources, wherein the particular configuration is selected from the plurality of candidate configurations based on the first score associated with the particular configuration.

\* \* \* \* \*